May 30, 1961 S. J. ERLING ET AL 2,986,118
MILKING MACHINE

Filed April 25, 1958 3 Sheets-Sheet 1

INVENTORS
SVEN JOHAN ERLING
GUNNAR PERÉN
BY
Davis, Hoxie & Faithfull
ATTORNEYS

May 30, 1961  S. J. ERLING ET AL  2,986,118
MILKING MACHINE
Filed April 25, 1958  3 Sheets-Sheet 2

INVENTOR.
SVEN JOHAN ERLING
GUNNAR PERÉN
BY
Davis, Hoxie & Faithfull
ATTORNEYS

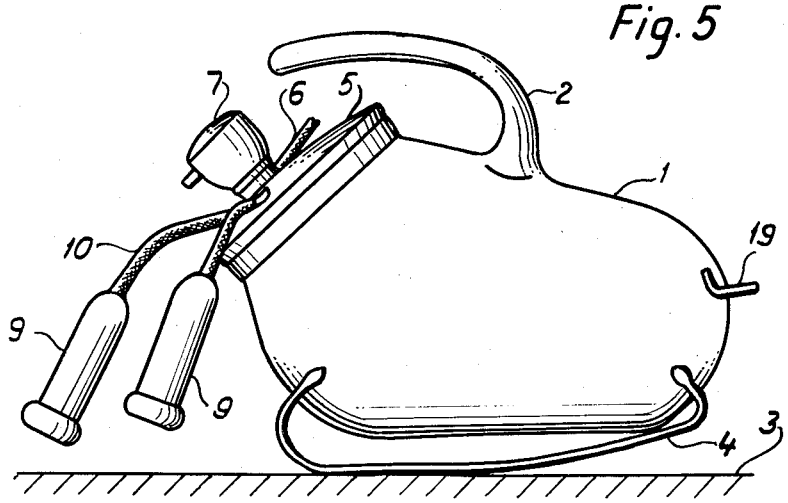
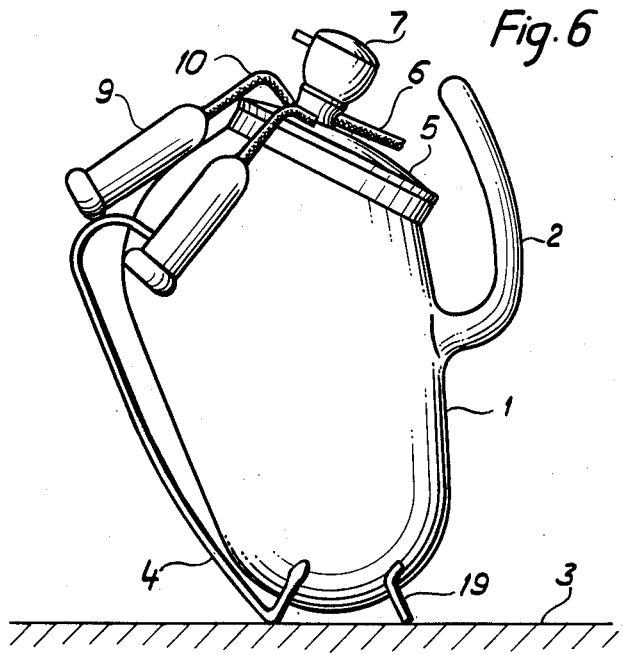

United States Patent Office 2,986,118
Patented May 30, 1961

2,986,118

MILKING MACHINE

Sven Johan Erling, Bromma, and Gunnar K. K. Perén, Saltsjobaden, Sweden, assignors to Aktiebolaget Separator, Stockholm, Sweden, a corporation of Sweden Filed Apr. 25, 1958, Ser. No. 730,862

Claims priority, application Sweden May 10, 1957

11 Claims. (Cl. 119—14.46)

The present invention relates to milking machines having a milk container which is kept under vacuum during the milking and which, through one or more tubes, is directly or indirectly connected to teat cups attached to the cow.

Milking machines which are suspended under the cow will, of course, automatically follow the movements of the cow; and, through the pull which the teat cups produce on the teats, they also have the advantage of usually giving a good clean-milking. However, this type of milker has the inconvenience of being troublesome to hang on and take down from the cow. While this trouble is avoided with milkers of the type in which the milk container stands on the floor, the latter type has the disadvantages that the clean-milking is less satisfactory and it is necessary to move the milk container as the cow moves in order to prevent the teat cups from being pulled off the udder.

The present invention has for its principal object the provision of a milking machine which combines the advantages of the two types of milkers mentioned above but which avoids their disadvantages.

In a milker made according to the invention, the milk container has supporting means slidable on a base and is arranged so that its center of gravity is displaced, as the container is filled with milk, toward a part of the container to which the teat-cup tubes are connected, the means on which the container is slidable being so designed that the container changes position owing to the displacement of the center of gravity. As the milking proceeds, the milk container inclines toward the udder and thus increases the pull on the teats. This insures a good clean-milking. Because the milking machine is slidable on the base, it can accompany the movements of the cow so that the teat cups are not pulled off the udder.

The slidable supporting means for the milk container may be provided in various ways. For example, the container may be slidable on the base with at least part of the container bottom in direct contact with the base, in which case the bottom may be made substantially convex with plane surfaces of contact. Another way is to provide the milk container with wheels, rollers or trundles which are swingable in every direction. However, when the base on which the milk container is supported is a rough floor, we prefer to provide the milk container with two skids which are parallel to each other. In the latter case, in order to provide the above-mentioned displacement of the center of gravity, it is desirable to form the skids as bows which are convex to the base and which are either continuously curved or composed of substantially straight angled portions.

An alternative way of obtaining the tiltability of the container, in case the container has skids, is to secure the skids at only one end to the container, so that the latter is spring-supported. The point of attachment of the skids to the container and the elasticity of the skids are chosen in such a way that the desired tilting of the container is obtained. In this embodiment, the skids are preferably formed with a substantially straight portion which is to bear against the base.

To facilitate manufacture and cleaning, it is advantageous to make the milk container of rounded form or as a body of revolution. In that case, to obtain the displacement of the gravity center, the container is made so that its diameter is greater toward that end to which the teat-cup tubes are connected and so that its axis inclines toward the horizontal plane.

When the teat cups have been detached from the udder after the milking has been completed, they will hang down along the side of the container. In order that they should not then come into contact with the floor or the ground and thus become dirtied, the inclination or tilting of the milk container must not be too great. At its end toward which the displacement of the gravity center takes place, the container may therefore be provided with a support, preferably movable, which limits the inclination. According to a further embodiment of the invention, the container may be provided with a handle at the side opposite that where the opening of the container is arranged, the handle serving as a supporting leg for the container when the latter is placed in an upright position with its opening directed substantially upward. This handle also serves, in co-operation with the carrying-handle of the container, to facilitate emptying of the container through its opening. The first-mentioned handle may be shaped as a broad bow to provide stable support for the container even when it otherwise rests against the base only on a point or small surface.

When the container is provided with skids, it may be supported in a stable manner in its upright position if the skids, at the side of the container opposite that where the opening of the container is arranged, serve as supporting legs. The skids as well as the above-mentioned handle which serves as a support may jointly form a three-point support.

Placing the container in the described upright position is of particular advantage when the container is elongated and its opening is arranged at one end of the container, because in this position, if the cover for the opening is removed, whirled-up particles from the base or floor are prevented from entering the opening and thus from contaminating the milk. If the cover, together with teat-cups disconnected from the udder, remains on the container and air should accidentally be sucked through the teat-cups, the risk of sucking particles (as from straw littered on a cow-shed floor) into the teat-cups is reduced when the container is in the upright or raised position.

The invention is explained more in detail below, reference being made to the accompanying drawings which, by way of example, show preferred embodiments of the new milking machine. In the drawings:

Figs. 5 and 6 are side elevational views of still another form of the milker, showing the container in its milking and raised positions, respectively.

Figure 1:
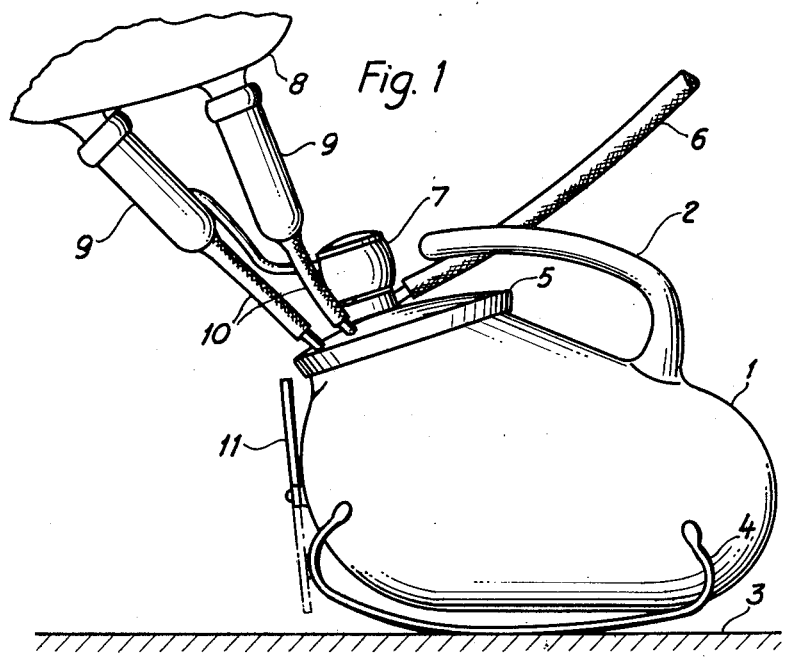
Fig. 1 is a side elevational view of one form of the milker.

In Fig. 1, reference numeral 1 designates the milk container proper, which can be carried by a handle 2.

The container is supported on the ground or floor 3 (referred to as a base) by two parallel, curved skids 4, one on each long side of the container. Only the skid at one side of the container is illustrated. In the top of the container is an opening which is closed by a cover 5 and through which the milk may be emptied. The interior of the container is placed under vacuum by means of a tube 6 which is connected with a vacuum pump (not shown). The usual pulsator 7 is situated on the cover 5. The teat cups 9 attached to the cow's udder 8 are directly connected by tubes 10 to the cover 5 through which they communicate with the interior of the container 1. In order that the container should not incline too far to the left towards the end of the milking, it is provided with a fold-down support or stop 11, the folded-down position of which is shown in dotted lines.

When the container 1 is empty at the start of the milking, the skids 4 support the container on base 3 substantially as shown in Fig. 1, or with the right-hand portions of the skids engaging the base. As the milking proceeds and the container gradually becomes filled with milk, the center of gravity of the container shifts to the left toward its covered end, due to the fact that the left-hand portion of the container is dimensioned to hold (for a given depth) a greater quantity of milk than the right-hand portion. As a result, the container gradually tilts counter-clockwise on the skids 4 until the lower end of the folded-down stop 11 engages the base 3. This increases the pull of the teat cups 9 on the teats, so as to insure good clean-milking.

Figure 2:
Figs. 2, 3 and 4 are similar views showing modifications of the skids supporting the milk container.

Another embodiment of the skids is shown in Fig. 2. Here, the skids 4 are made generally bow-shaped by providing them with three straight portions 13, 14 and 15 forming a small angle to each other. These skids function generally in the same way as the skids shown in Fig. 1, except that the tilting movement is more stepwise than continuous as the milking proceeds.

Figure 3:
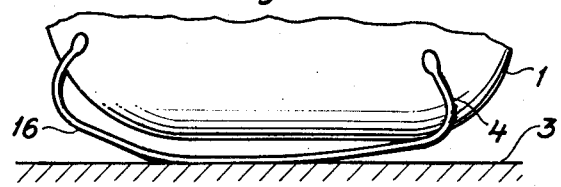

A third embodiment of the skids is shown in Fig. 3. Here, the skids 4 are provided, as a precautionary measure, with a straight portion 16 on which the container will come to rest if it should incline too much to the left, as by the milk swirling around in the container.

Figure 4:
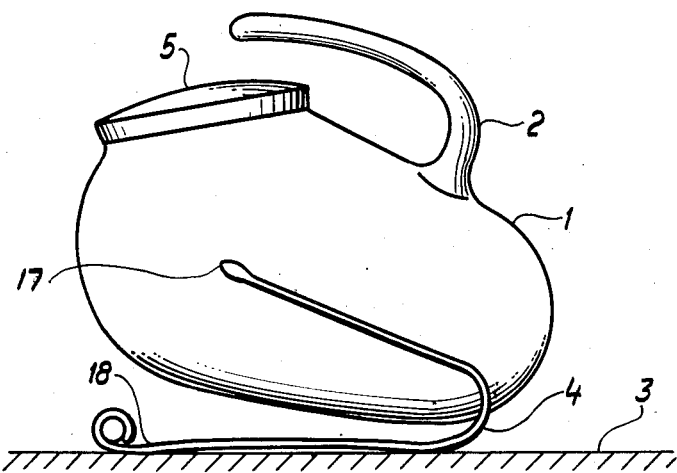
Figure 4A:
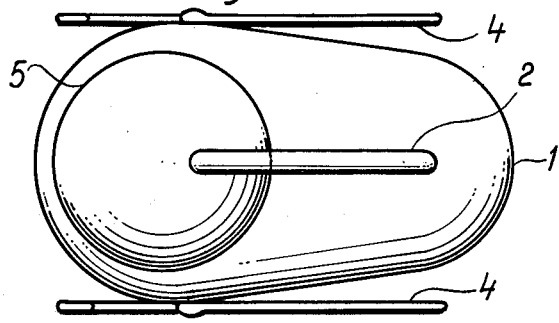
Fig. 4A is a plan view of the container shown in Fig. 4.

In Fig. 4, the skids 4 are shown secured only at one end 17 to the container 1. Because the skids are V- or U-shaped, they have a free shank 18 which bears along a straight portion against the base 3. By making the skids of steel-tubing of suitable elasticity, the left-hand end of the container will sink as milk fills the container, thereby causing the desired tilting.

Fig. 5 shows the right-hand end of the container 1 provided with an additional handle 19 which serves to facilitate the emptying of the container and which may be a bow whose width extends at right angles to the plane of the drawing.

Fig. 6 shows the container 1 in raised position, the handle 19 and the skids 4 forming a three-point support for the container. As appears from Fig. 6, the opening of the container is in this case located higher above the ground than when the container takes the position shown in Fig. 5, which, as has already been mentioned, is preferable when the cover 5 is removed. This applies also to the openings of disconnected teat-cups when these remain on the cover in the raised position of the container.

It will be apparent that in each of the illustrated embodiments, the skids 4 form a slidable support for the container adapted to rest and slide on the supporting surface 3 and including means for tilting the container in one direction as the container is filled with milk. The cover or lid 5 constitutes a part on the container for connecting the same to the teat-cup tubes and through which milk is drawn into the container, this part being located to tilt downward with the aforementioned tilting of the container.

We claim:

1. In a milking machine, the combination of a milk container adapted to be maintained under vacuum, a part on the container for connecting same to a teat-cup tube and through which milk is drawn into the container, the container having an end portion of large volumetric capacity per unit of depth and an end portion horizontally displaced from said large end portion and of small volumetric capacity per unit of depth, the container also having a bottom interconnecting said end portions, whereby the center of gravity of the container shifts horizontally toward said large end portion as the container is filled with milk, and a support connected to the container and adapted to rest on a supporting surface, said support including means on which the container is tilted by said shifting of the center of gravity, said connecting part being located on the container to tilt downward with said tilting of the container.

2. The combination according to claim 1, in which said part is located at one end portion of the container, said end portion being dimensioned to hold a greater quantity of milk than the opposite end portion for a given depth.

3. The combination according to claim 1, in which the support comprises skids secured to the container.

4. The combination according to claim 1, in which the support comprises generally bow-shaped skids secured to the container and having their convex surfaces adapted to rest on said supporting surface.

5. The combination according to claim 1, in which the support comprises generally bow-shaped skids secured to the container and having their convex surfaces adapted to rest on said supporting surface, each skid including substantially straight portions extending an an angle to each other to form the generally bow-shape.

6. The combination according to claim 1, in which the container has a removable lid covering an opening of the container, the support comprising skids secured to the container and on which the container is adapted to rock, the skids forming legs on which the container is adapted to rest in a stable upright position with said opening directed substantially upward.

7. The combination according to claim 1, in which the support comprises skids each secured at only one end to the container.

8. The combination according to claim 1, in which the support comprises skids each secured at only one end to the container, each skid having a substantially straight portion adapted to rest and slide on the supporting surface.

9. The combination according to claim 1, in which the container is a body of rotation having a greater diameter at one end portion of the container, said part being located at said one end portion, the container axis being inclined to the horizontal when the container rests on the support.

10. The combination according to claim 1, comprising also a stop on the container engageable with the supporting surface to limit said tilting of the container.

11. The combination according to claim 1, in which the container has at one end portion a removable lid covering an opening of the container, and a handle on the container at the opposite end portion, said handle forming a leg on which the container is adapted to rest in a stable upright position with said opening directed substantially upward.

References Cited in the file of this patent

UNITED STATES PATENTS

| | | |
|---|---|---|
| 2,343,749 | Conde | Mar. 7, 1944 |
| 2,358,037 | Sunderland | Sept. 2, 1944 |
| 2,665,663 | Rawson | Jan. 12, 1954 |
| 2,775,224 | Rawson et al. | Dec. 25, 1956 |